March 8, 1955     A. H. SCHUTTE     2,703,732
MASS LIFT
Filed Jan. 5, 1951
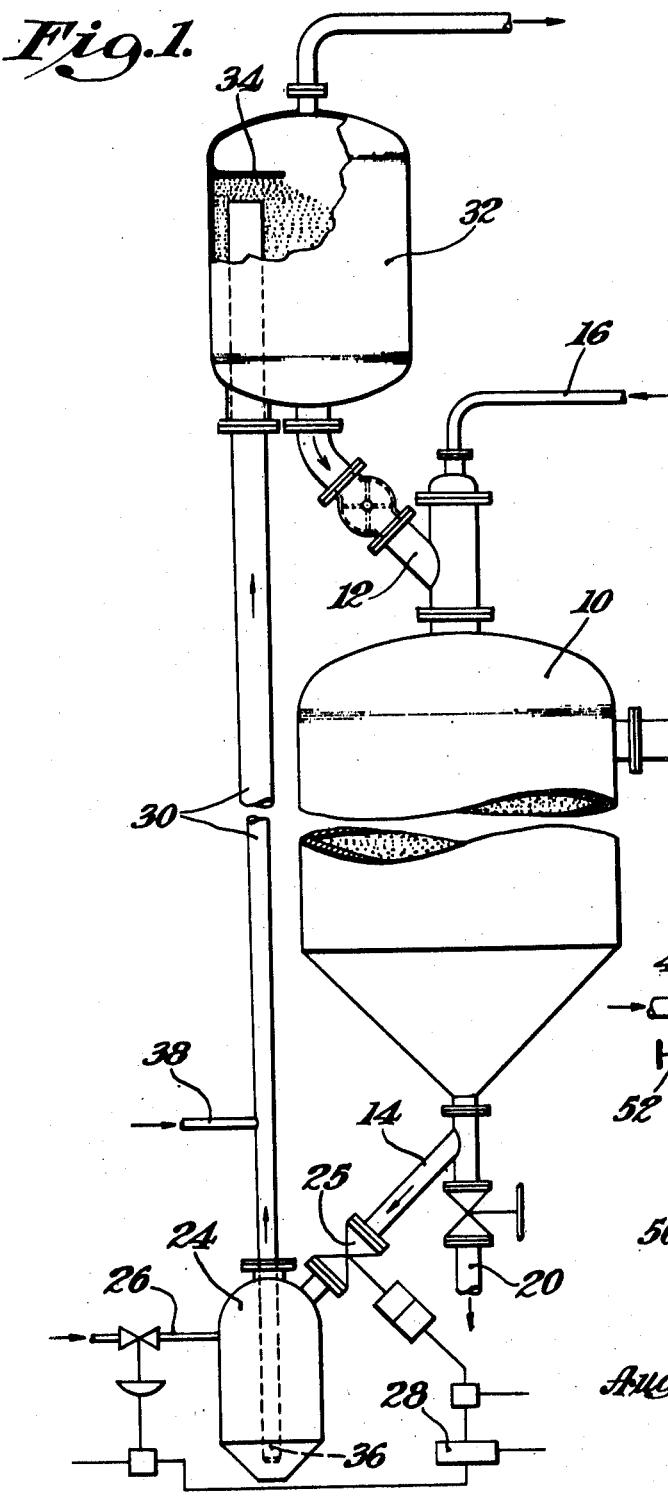
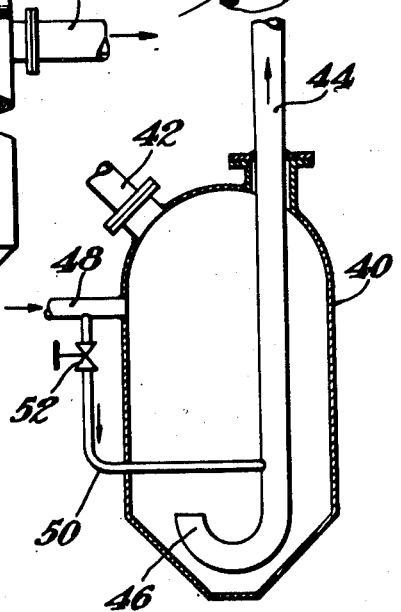
INVENTOR
August Henry Schutte
Nathaniel Ely
ATTORNEY

United States Patent Office 2,703,732
Patented Mar. 8, 1955

2,703,732

MASS LIFT

August H. Schutte, Hastings-on-Hudson, N. Y., assignor, by mesne assignments, to Union Oil Company of California, Los Angeles, Calif., a corporation of California Application January 5, 1951, Serial No. 204,652

7 Claims. (Cl. 302—17)

This invention relates to improvements in the elevation of granular solid particles such as catalyst, heat carrying contact particles, coke, etc. It is more particularly an improvement on my copending application Serial No. 90,026, filed April 27, 1949.

It has been proposed to circulate relatively large quantities of granular heat carrying or catalytic material for chemical and physical reactions including the conversion of hydrocarbons through a closed circuit including a suitable heating zone, a reaction zone and an elevating mechanism for repeated utilization of the contact material. It has also been proposed to use a comparatively large particle size material in the range of 40 mesh to ½ inch in major cross section as referred to in my copending application. One of the particular advantages of the use of the large size heat contact particles is the advantage of gravitational flow through the reactor and regenerator which is particularly beneficial in the conversion of hydrocarbon oils. There are of course many other advantages many of which depend on the economical elevation of the particles from a low point to a high point in the system.

As described in my copending application it has been found that dense packed masses of the large particles can be elevated as a packed body at less velocity than required for a gas-borne condition by applying adequate gas under pressure to a blow case or forwarding zone into which the particles flow by gravity. It is found that if fluidization is suppressed, a particle velocity of from 3 to 4 ft./sec. is possible and the material is elevated in almost its maximum gravity packed condition. With the very low velocity of elevation there is practically no tendency for the particles to impinge against the wall of the conduit or against each other and attrition and formation of fines is substantially eliminated. The pressure required for the elevation of such material to a height of sixty four feet is in the order of 30–50 lbs./sq. in.

It is the principal object of my invention to provide an improved method and apparatus for vapor or gas lift of granular masses whereby elevation at low velocity can be accomplished in the continuous cyclic reaction systems with effective control of flow rates.

A more particular object of my invention is to provide means for reducing the pressure required to operate a granular lift of this type and to also reduce the required vapor volume.

Further objects and advantages of my invention will appear from the following description of a preferred form of embodiment thereof taken in connection with the attached drawing in which:

Fig. 1 is a schematic elevation of a cyclic system using a vapor lift in accordance with my invention.

Fig. 2 is a central vertical section of a modified blow case.

Referring more particularly to the drawing, the system includes a reactor 10 into which granular solids enter through line 12 and from which the solids are removed by line 14 after having served their purpose of supplying heat or otherwise carrying out a desired conversion. As a specific example of such a reaction and in accordance with the method disclosed in copending application Serial No. 3,747, filed January 22, 1948, now Patent No. 2,561,334 July 24, 1951, of which I am a coinventor, I may use the solids for reducing a liquid heavy hydrocarbon which may be introduced at 16, the vapors being removed at 18. If there be excess contact material as for example, coke, this may be withdrawn from the system through outlet conduit 20.

If it is desirable to reheat or otherwise recondition the contact material as by oxidation or other process, this may also be accomplished within the vessel 10. It is contemplated that the granular material leaving through line 14 is prepared for reentry into the reactor and the internal structure of the element 10 is not particularly pertinent to the features of this invention.

The granular material flows by gravity into the blow case or forwarding chamber 24 which may be provided with a valve 25 for sealing. An elevating gas or vapor such as steam may be introduced to the forwarding chamber 24 through line 26 after valve 25 is closed and this sequence may be under suitable control of timer device 28. The contact material then moves upward under the influence of the high pressure gas or vapor through downwardly tapered lift leg 30 to the hopper 32 above reactor 10. A baffle 34 at the upper part of the lift leg 30, in conjunction with the accumulated solids in vessel 32, will suppress fluidization in the lift line 30.

Under normal operations, I find that by the application of 30–50 p. s. i. g. steam at 26, I can move the large granular contact material through a 6" lift leg 30 to a height of 64 feet at the rate, during delivery, of 30–100 tons/hr. In accordance with my present invention, however, I find that by introducing steam to the lift leg 30 at some intermediate point 36 or 38, I obtain a limited controlled aeration. As a result I can obtain equal lifting effect using less pounds of steam at 26 and it need only be about 12 to 18 p. s. i. g.

The upper portion of the leg will be less dense packed than gravity packed but will be more dense than the so called dense phase fluidized condition. Specifically, I prefer to call this a dense phase leg and enough steam is used to eliminate bridging without causing turbulence and attrition.

As a result two conditions are noted. In the first place the mass can only move up the lift leg 30 at the rate the mass moves away from the uppermost portion of the lift leg in vessel 32 and due to the dense packing and the relatively high gas pressure the superficial gas velocity in the lift leg is only approximately 2 to 8 ft./sec. Since the terminal settling velocity of the particles in use is 30 to 50 feet per second, the material is not gas-borne, or fluidized.

The reason for this unexpected result appears to be due to the creation of a condition in the upper part of the leg which eliminates bridging and pushing up this material by the residual thrust of the lower portion of the line and/or the pickup nozzle. Only enough steam is needed in the top of the leg 30 to obtain this above effect. If the amount of supplementary gas is reduced below this minimum the bottom line pressure requirement increase and approaches a pressure somewhat greater than that equivalent to a gravity-packed column. Increasing the amount of supplementary gas decreases the pressure requirement beneficially until dilution, fluidization, slugging and attrition set in.

The precise point of entry of the gas or vapor is not critical as long as it is beyond the point of solids entry. Naturally the lower down this point is in the leg, the greater the reduction in pressure. I have found that an opening 36 in the lift leg wall within the chamber 24 is quite satisfactory and it can also be outside the chamber as at 38.

In Fig. 2 I have shown a modified type of blow case 40 having a granular solid inlet at 42 and a lift leg 44. In this case, the lift leg 44 is provided with a return bend 46 which materially aids in the free feeding of the granular particles to the lift leg.

Lifting of the granular particles through leg 44 is accomplished by applying a fluid pressure from line 48 onto the particles and a diluting effect is accomplished by the injection of the fluid pressure through line 50 to the lift leg. Valve 52 may be used to control this effect.

With very large units circulating from 500 to 1000 tons per hour through elevations of 100 feet or more, the lifting gas or vapor becomes an item of major consequence. Generally steam is preferred because of its inert characteristic and relatively low cost, but even in such a case very substantial savings result.

I claim:

1. The method of uniformly and controllably elevating granular masses from a first chamber at a low elevation through a substantially vertical conduit to a second chamber at an elevated position with respect to the first chamber by the use of gas at velocities insufficient to support the particles of the granular mass one from the other, which comprises subjecting the granular mass in the lowermost chamber to a gas under sufficient pressure to raise the granular mass as a packed column and in volume sufficient to create a pressure drop greater than the weight of said column, supplementing the lifting effect part way up the conduit by introducing additional gas to said conduit to establish and maintain a lighter, nonbridging, nonturbulent mass in the upper portion of the conduit and suppressing the outlet of particles at the outlet end of the conduit to prevent fluidization of the entire column.

2. In a system of repeatedly circulating solid contact material in a confined cyclic path including a low level zone and a high level zone, with a minimum of erosion and attrition and in which the material is passed from the low level zone through a transmission zone and is thence elevated to the high level zone in a vapor lift line with a high concentration of solids and a minimum gas velocity, the improvement which comprises applying a fluid pressure to the solids pick-up zone in excess of that required to balance the pressure differential between the high level zone and the transmission zone, regulating the solids concentration, velocity and gas flow in the lift line, applying a secondary fluid stream under pressure at a point in the lift line above the transmission zone whereby the material in the upper portion of the lift line is maintained in a non-bridging, non-turbulent dense phase fluidized state and is elevated by the residual thrust of the material leaving the lower pickup zone and suppressing the outlet of particles at the outlet of said lift line to establish and maintain mass flow at the portion of the lift line between the inlet and the point of introduction of the secondary fluid stream.

3. A lifting system for elevating particle form solids from a low level chamber through a conduit to a high level chamber, said conduit being tapered toward and terminating at its lower end in a nozzle submerged in the solids, means to apply a gas under pressure to said low level chamber, means above said nozzle for introducing an additional quantity of gas to said conduit thus augmenting the gas flow thru said nozzle with the solids and reducing the density of packing of solids above the point of injection of the additional gas, a baffle disengaging device above the end of said conduit in the high level chamber adapted to intercept the delivered solids and establish a pile of solids which limits the solids flow in the lift line, means controlling the gravity removal of the solids from said high level chamber, the total quantity of gas applied to the low level chamber in the main part of the lift line being only sufficient to produce a superficial velocity which is considerably lower than the settling velocity of the solid particles in the gas and the pressure in the bottom of the line being substantially less than that equivalent to the weight of an equal column of solid particles at maximum packing density.

4. The method of conveying pulverulent material which comprises maintaining a vertical column of the material in a conduit from the inlet to the discharge outlet thereof by continuously supplying material at the inlet of the conduit as it is discharged at the outlet, advancing the column through the conduit by subjecting it to a gaseous pressure applied continuously at the inlet end of the conduit, submerging the discharge of the particles from the outlet of the conduit to establish and maintain a dense packed mass in the lower part of said conduit, and rendering the advancing material more fluent above the lower part of said conduit by injecting a compressed gas into the material in the conduit at a point a short distance beyond the first point of gas application.

5. In a solid particle transfer system in which the solid particles are fed into a sealed forwarding zone, and are moved by gas pressure through a restricted lift passage to an elevated gas release zone, and wherein the gas pressure produces a fluid flow creating a pressure drop which is in excess of the gravitational weight of the particles in the lift passage plus the frictional resistance to flow of the particles through the lift passage, and wherein the discharge of particles from the lift passage is submerged by other particles to establish a dense packed mass of particles in at least the lower part of the lift passage, the improvement which comprises injecting a gas under pressure into the lift passage intermediate its ends to fluidize the particles above the point of injection, whereby the total gravitational weight of the column is intermediate the weight of a completely fluidized mass and a completely dense packed mass, the maximum gas pressure employed thus being lower than if only a single injection at the forwarding zone were used, and in which the capacity of the lift passage is substantially that of the dense packed lower portion.

6. In a solid particle transfer system as claimed in claim 5 wherein the solid particles are drawn off from the elevated gas release zone by gravity and pass through a hydrocarbon conversion zone and a reheating zone before passing back to the sealed forwarding zone.

7. An apparatus for conveying granular solids which comprises an elongated conveyance conduit, means for maintaining an accumulation of said solids at the inlet of said conveyance conduit, means for passing a conveyance fluid through said conveyance conduit to convey said solids concurrently with said conveyance fluid from said inlet to the outlet of said conveyance conduit, means to inject a supplementary conveyance fluid into said conveyance conduit between said inlet and said outlet whereby the static bulk density of said solids in said conveyance conduit is lower in the upper portion of said conveyance conduit above the point of injection of said supplementary conveyance fluid than in the portion of the conveyance conduit between the inlet and the point of injection of said supplementary conveyance fluid, and means for applying a compacting force against solids discharging at said outlet to suppress fluidization in said conveyance conduit.

References Cited in the file of this patent

UNITED STATES PATENTS

| | | |
|---|---|---|
| 2,493,911 | Brandt | Jan. 10, 1950 |
| 2,509,983 | Morrow | May 30, 1950 |

FOREIGN PATENTS

| | | |
|---|---|---|
| 7,075 | Holland | Mar. 18, 1922 |
| 180,397 | Great Britain | May 11, 1922 |
| 268,667 | Great Britain | Apr. 7, 1927 |